United States Patent
Liu et al.

(10) Patent No.: US 12,008,319 B2
(45) Date of Patent: Jun. 11, 2024

(54) METHOD AND APPARATUS FOR SELECTING ANSWERS TO IDIOM FILL-IN-THE-BLANK QUESTIONS, AND COMPUTER DEVICE

(71) Applicant: PING AN TECHNOLOGY (SHENZHEN) CO., LTD., Guangdong (CN)

(72) Inventors: Xiang Liu, Guangdong (CN); Xiuling Chen, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 387 days.

(21) Appl. No.: 17/613,506

(22) PCT Filed: Nov. 30, 2020

(86) PCT No.: PCT/CN2020/132602
§ 371 (c)(1),
(2) Date: Nov. 23, 2021

(87) PCT Pub. No.: WO2021/159816
PCT Pub. Date: Aug. 19, 2021

(65) Prior Publication Data
US 2022/0261546 A1 Aug. 18, 2022

(30) Foreign Application Priority Data
Sep. 4, 2020 (CN) .......................... 202010923909.X (51) Int. Cl.
*G06F 40/289* (2020.01)
(52) U.S. Cl.
CPC ................. *G06F 40/289* (2020.01)

(58) Field of Classification Search
CPC ...................................................... G06F 40/289
(Continued)

(56) References Cited

U.S. PATENT DOCUMENTS

| | | | | |
|---|---|---|---|---|
| 8,602,793 | B1 * | 12/2013 | Sniedzins | G09B 5/00 434/323 |
| 10,585,985 | B1 * | 3/2020 | Flor | G06F 16/3344 |
| 2017/0337479 | A1 | 11/2017 | Trischler et al. | |

FOREIGN PATENT DOCUMENTS

| CN | 108924167 A | 11/2018 |
|---|---|---|
| CN | 110990556 A | 4/2020 |

OTHER PUBLICATIONS

Miki Kazuhiro et al., A method for solving blank space replenishment problems by using Bert, Mar. 4, 2020, pp. 1-7.
(Continued)

*Primary Examiner* — Susan I McFadden (57) ABSTRACT

Disclosed are a method and apparatus for selecting answers to idiom fill-in-the-blank questions, a computer device, and a storage medium. The method includes: obtaining a question text of idiom fill-in-the-blank questions, the question text including a fill-in-the-blank text and n candidate idioms, and the fill-in-the-blank text including m fill-in-the-blanks to be filled in with the candidate idioms; obtaining an explanatory text of all the candidate idioms; obtaining, through an idiom selection fill-in-the-blank model, a confidence that each fill-in-the-blank is filled in with each candidate idiom; selecting m idioms from the n candidate idioms to form multiple groups of answers; calculating a sum of the confidences that the fill-in-the-blanks are filled in with the candidate idioms in each group of answers; and obtaining a group of answers with the highest confidence sum as answers to the idiom fill-in-the-blank questions. The present application implements answers to idiom fill-in-the-blank questions with high accuracy.

18 Claims, 3 Drawing Sheets

(58) Field of Classification Search
USPC .............................................................. 704/9
See application file for complete search history.

(56) References Cited

OTHER PUBLICATIONS

Tomoya Kita et al., RNN Using language models automatic solution to a common sentence completion problem, the 23rd Annual Conference of the Association for Natural Language Processing, Mar. 6, 2017, pp. 1149-1152.

Tomoya Kita et al., Gated-Attention Reader with the use of the word automatic answer to the question, the 24th Annual Conference of the Association for Natural Language Processing, Mar. 5, 2018, pp. 967-970.

Ru Li et al., Answer Prediction of Reading Comprehension, Journal of Shanxi University (Nat. Sci. Ed.), May 17, 2017, pp. 763-770, vol. 40, No. 4.

* cited by examiner

METHOD AND APPARATUS FOR SELECTING ANSWERS TO IDIOM FILL-IN-THE-BLANK QUESTIONS, AND COMPUTER DEVICE

The present application claims the priority to Chinese Patent Application No. 202010923909.X, filed with the China National Intellectual Property Administration on Sep. 4, 2020, and entitled "METHOD AND APPARATUS FOR SELECTING ANSWERS TO IDIOM FILL-IN-THE-BLANK QUESTIONS, AND COMPUTER DEVICE", which is incorporated herein by reference in its entirety.

TECHNICAL FIELD

The present application relates to the field of artificial intelligence technologies, and in particular, to a method and apparatus for selecting answers to idiom fill-in-the-blank questions, a computer device, and a storage medium.

BACKGROUND

Idioms are fixed phrases with a simple form, a rich meaning, and a long history, and have been used for a long time in the Chinese language. They are the epitome of Chinese traditional culture and come from various sources. Idioms are complicated in structure, and have been the key and difficult points in Chinese teaching for many years. Idiom doze is a key knowledge point and common examination question that need to be mastered in Chinese learning in primary and secondary schools. In the prior art, such idiom selection fill-in-the-blank questions have always been answered through human brain intelligence. When helping their children with homework, parents often seem to be unable to handle difficult questions such as idiom fill-in-the-blank questions with their own knowledge. Therefore, they use a lot of APPs and the Internet to search for answers. However, the inventor realizes that, in search over the existing APPs and the Internet, answers to idiom fill-in-the-blank questions need to be manually collected, and the answers cannot be automatically judged by using an intelligent method. Consequently, parents or students cannot find the answers after searching for a long time because manually collected questions are incomplete.

Technical Problems

A main objective of the present application is to provide a method and apparatus for selecting answers to idiom fill-in-the-blank questions, a computer device, and a storage medium, aiming to overcome the disadvantage that answers cannot be given to the idiom fill-in-the-blank questions because manually collected questions are incomplete at present.

Technical Solutions

To achieve the foregoing objective, the present application provides a method for selecting answers to idiom fill-in-the-blank questions, including the following steps:
  obtaining a question text of idiom fill-in-the-blank questions, where the question text includes a fill-in-the-blank text and n candidate idioms, and the fill-in-the-blank text includes m fill-in-the-blanks to be filled in with the candidate idioms;
  obtaining an explanatory text of all the candidate idioms;
  inputting the fill-in-the-blank text and the explanatory text into a pre-trained idiom selection fill-in-the-blank model, to obtain a confidence that each of the fill-in-the-blanks is filled in with each of the candidate idioms;
  selecting m idioms from the n candidate idioms, and randomly arranging the m idioms to fill in the m fill-in-the-blanks to form a plurality of groups of answers, where in each group of answers, the candidate idioms can be selected to fill in the fill-in-the-blanks only once at most;
  calculating, based on a KM algorithm and the confidence that each of the fill-in-the-blanks is filled in with each of the candidate idioms, a sum of the confidences that the fill-in-the-blanks are filled in with the candidate idioms in each group of answers; and
  obtaining a group of answers with the highest confidence sum as target answers, and outputting the target answers as answers to the idiom fill-in-the-blank questions.

The present application further provides an apparatus for selecting answers to idiom fill-in-the-blank questions, including:
  a first acquisition unit, configured to obtain a question text of idiom fill-in-the-blank questions, where the question text includes a fill-in-the-blank text and n candidate idioms, and the fill-in-the-blank text includes m fill-in-the-blanks to be filled in with the candidate idioms;
  a second acquisition unit, configured to obtain an explanatory text of all the candidate idioms;
  a first output unit, configured to input the fill-in-the-blank text and the explanatory text into a pre-trained idiom selection fill-in-the-blank model, to obtain a confidence that each of the fill-in-the-blanks is filled in with each of the candidate idioms;
  a selection unit, configured to select m idioms from the n candidate idioms, and randomly arrange the m idioms to fill in the m fill-in-the-blanks to form a plurality of groups of answers, where in each group of answers, the candidate idioms can be selected to fill in the fill-in-the-blanks only once at most;
  a calculation unit, configured to calculate, based on a KM algorithm and the confidence that each of the fill-in-the-blanks is filled in with each of the candidate idioms, a sum of the confidences that the fill-in-the-blanks are filled in with the candidate idioms in each group of answers; and
  a second output unit, configured to obtain a group of answers with the highest confidence sum as target answers, and output the target answers as answers to the idiom fill-in-the-blank questions.

The present application further provides a computer device, including a memory and a processor, where a computer program is stored in the memory; and when the processor executes the computer program, a method for selecting answers to idiom fill-in-the-blank questions is implemented, and the method includes the following steps:
  obtaining a question text of idiom fill-in-the-blank questions, where the question text includes a fill-in-the-blank text and n candidate idioms, and the fill-in-the-blank text includes m fill-in-the-blanks to be filled in with the candidate idioms;
  obtaining an explanatory text of all the candidate idioms;
  inputting the fill-in-the-blank text and the explanatory text into a pre-trained idiom selection fill-in-the-blank model, to obtain a confidence that each of the fill-in-the-blanks is filled in with each of the candidate idioms;

selecting m idioms from the n candidate idioms, and randomly arranging the m idioms to fill in the m fill-in-the-blanks to form a plurality of groups of answers, where in each group of answers, the candidate idioms can be selected to fill in the fill-in-the-blanks only once at most;

calculating, based on a KM algorithm and the confidence that each of the fill-in-the-blanks is filled in with each of the candidate idioms, a sum of the confidences that the fill-in-the-blanks are filled in with the candidate idioms in each group of answers; and obtaining a group of answers with the highest confidence sum as target answers, and outputting the target answers as answers to the idiom fill-in-the-blank questions.

The present application further provides a computer-readable storage medium, on which a computer program is stored, where when the computer program is executed by a processor, a method for selecting answers to idiom fill-in-the-blank questions is implemented, and the method includes the following steps:

obtaining a question text of idiom fill-in-the-blank questions, where the question text includes a fill-in-the-blank text and n candidate idioms, and the fill-in-the-blank text includes m fill-in-the-blanks to be filled in with the candidate idioms;

obtaining an explanatory text of all the candidate idioms;

inputting the fill-in-the-blank text and the explanatory text into a pre-trained idiom selection fill-in-the-blank model, to obtain a confidence that each of the fill-in-the-blanks is filled in with each of the candidate idioms;

selecting m idioms from the n candidate idioms, and randomly arranging the m idioms to fill in the m fill-in-the-blanks to form a plurality of groups of answers, where in each group of answers, the candidate idioms can be selected to fill in the fill-in-the-blanks only once at most;

calculating, based on a KM algorithm and the confidence that each of the fill-in-the-blanks is filled in with each of the candidate idioms, a sum of the confidences that the fill-in-the-blanks are filled in with the candidate idioms in each group of answers; and obtaining a group of answers with the highest confidence sum as target answers, and outputting the target answers as answers to the idiom fill-in-the-blank questions.

Beneficial Effects

The present application provides a method and apparatus for selecting answers to idiom fill-in-the-blank questions, a computer device, and a storage medium. The method includes: obtaining a question text of idiom fill-in-the-blank questions, where the question text includes a fill-in-the-blank text and n candidate idioms, and the fill-in-the-blank text includes m fill-in-the-blanks to be filled in with the candidate idioms; obtaining an explanatory text of all the candidate idioms; inputting the fill-in-the-blank text and the explanatory text into a pre-trained idiom selection fill-in-the-blank model, to obtain a confidence that each of the fill-in-the-blanks is filled in with each of the candidate idioms; selecting m idioms from the n candidate idioms, and randomly arranging the m idioms to fill in the m fill-in-the-blanks to form a plurality of groups of answers; calculating, based on the confidence that each of the fill-in-the-blanks is filled in with each of the candidate idioms, a sum of the confidences that the fill-in-the-blanks are filled in with the candidate idioms in each group of answers; and obtaining a group of answers with the highest confidence sum as target answers, and outputting the target answers as answers to the idiom fill-in-the-blank questions. In the present application, artificial intelligence is used to obtain the sum of the confidences that the fill-in-the-blanks are filled in with the candidate idioms in each group of answers, so as to use the group of answers with the highest confidence sum as the target answers, and obtain the answers to the idiom fill-in-the-blanks with high efficiency and high accuracy.

The realization of the objectives, functional features, and advantages of the present application are further described with reference to the accompanying drawings in combination with the embodiments.

DESCRIPTION OF EMBODIMENTS

Figure 1:
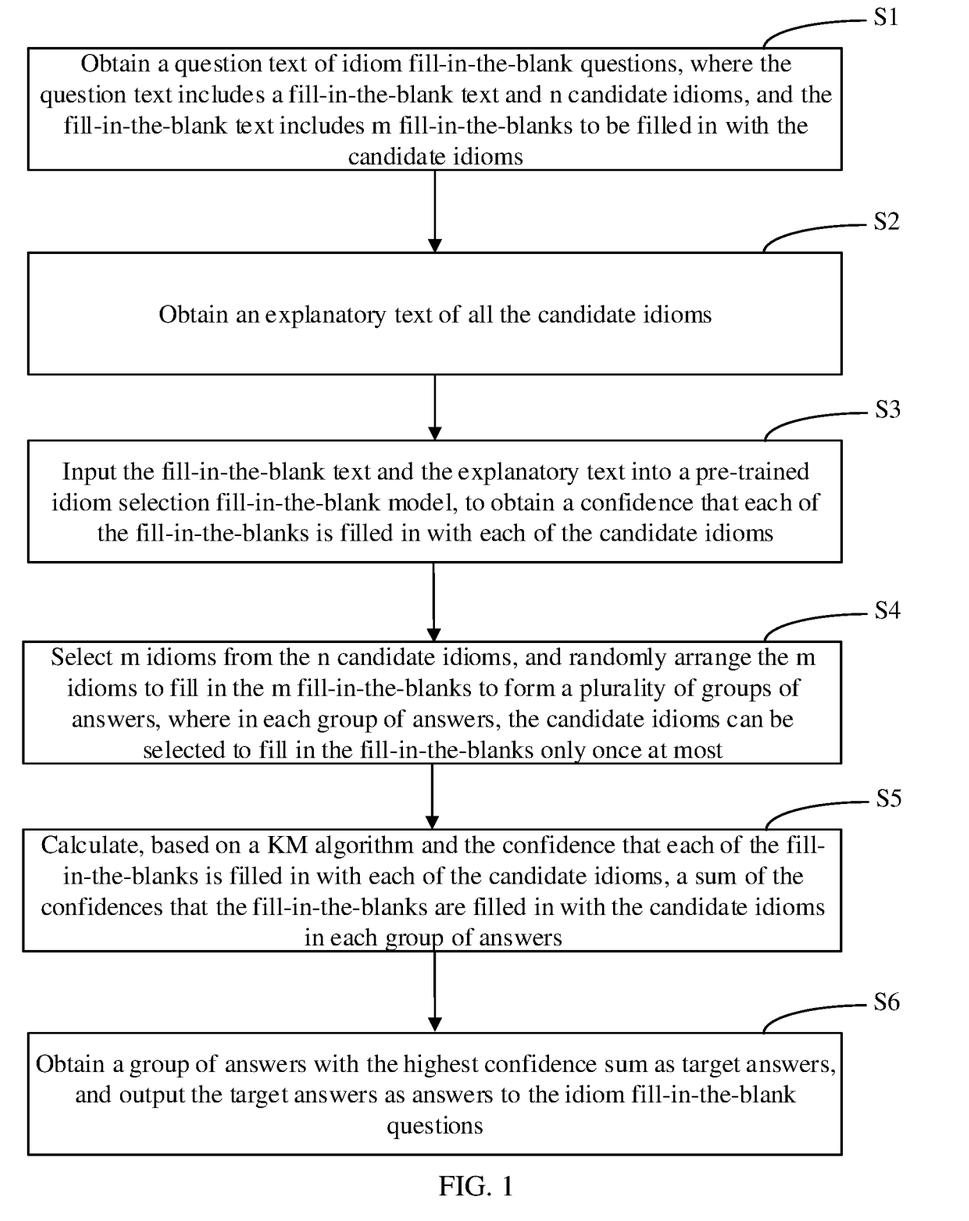
FIG. 1 is a schematic diagram of steps of a method for selecting answers to idiom fill-in-the-blank questions in an embodiment of the present application.

Referring to FIG. 1, an embodiment of the present application provides a method for selecting answers to idiom fill-in-the-blank questions, including the following steps.

Step S1: Obtain a question text of idiom fill-in-the-blank questions, where the question text includes a fill-in-the-blank text and n candidate idioms, and the fill-in-the-blank text includes m fill-in-the-blanks to be filled in with the candidate idioms.

Step S2: Obtain an explanatory text of all the candidate idioms.

Step S3: Input the fill-in-the-blank text and the explanatory text into a pre-trained idiom selection fill-in-the-blank model, to obtain a confidence that each of the fill-in-the-blanks is filled in with each of the candidate idioms.

Step S4: Select m idioms from the n candidate idioms, and randomly arrange the m idioms to fill in the m fill-in-the-blanks to form a plurality of groups of answers, where in each group of answers, the candidate idioms can be selected to fill in the fill-in-the-blanks only once at most.

Step S5: Calculate, based on a KM algorithm and the confidence that each of the fill-in-the-blanks is filled in with each of the candidate idioms, a sum of the confidences that the fill-in-the-blanks are filled in with the candidate idioms in each group of answers.

Step S6: Obtain a group of answers with the highest confidence sum as target answers, and output the target answers as answers to the idiom fill-in-the-blank questions.

In this embodiment, the foregoing method is applied to a scenario in which answers to idiom fill-in-the-blank questions are output, so that artificial intelligence is used to output the answers to the idiom fill-in-the-blank questions with high efficiency and high accuracy. The solution in present application can be further applied to the field of smart education to promote construction of smart cities.

As described in step S1 above, the question text of the foregoing idiom fill-in-the-blank questions is usually an electronic text of a student's test questions. The foregoing question text includes a fill-in-the-blank text composed of a plurality of sentences, and a plurality of candidate idioms (i.e., candidate answers). The student can select idioms from the foregoing candidate idioms to fill in the fill-in-the-blanks in the foregoing fill-in-the-blank text.

As described in step S2 above, an explanatory text of all idioms (i.e., a text that explains meanings of idioms) is stored in a database (such as an idiom dictionary), and the explanatory text of all the candidate idioms can be obtained from the foregoing database.

As described in step S3 above, the idiom selection fill-in-the-blank model is pre-trained. The idiom selection fill-in-the-blank model is obtained by training based on a BERT language model-based natural language neural network. The foregoing idiom selection fill-in-the-blank model is used to predict a confidence that each idiom with which an idiom-fill-in-the-blank question is filled in is a correct answer. The way to determine whether an idiom with which an idiom-fill-in-the-blank question is filled in is a correct answer is to calculate semantic coherence between an explanatory text of the idiom and a sentence in the idiom-fill-in-the-blank question based on the foregoing idiom selection fill-in-the-blank model, so as to determine a corresponding confidence.

As described in step S4 above, m idioms are selected from the n candidate idioms, and the m idioms are randomly arranged to fill in the m fill-in-the-blanks to form a plurality of groups of answers. In this embodiment, a random arrangement in mathematics is used to select m idioms from the n candidate idioms and randomly arrange the idioms into a plurality of groups of combinations, and each group of combination is used as a preselected answer to fill in the foregoing idiom fill-in-the-blank question. It can be understood that the number of the foregoing combinations is $n*(n-1)*(n-2)* \ldots *(n-m+1)$.

As described in step S5 above, because the confidence that each of the fill-in-the-blanks is filled in with each of all the candidate idioms has been calculated in step S3 above, the sum of the confidences that the fill-in-the-blanks are filled in with the candidate idioms in each group of answers can be calculated. In this embodiment, the foregoing confidence sum is calculated by using in the KM algorithm, where the KM algorithm is a general algorithm and is not described in detail herein.

As described in step S6 above, a group of answers with the highest confidence sum is obtained and used as target answers. It can be understood that the foregoing confidence expresses a degree of confidence that the candidate idioms are correct when used to fill in the fill-in-the-blanks. Obviously, a higher confidence of answers indicates that the answers are closer to the correct ones. Therefore, when the foregoing confidence sum is the highest, corresponding target answers are closest to the correct ones, and finally the target answers are output as the answers to the idiom fill-in-the-blank questions. In this embodiment, the confidence that each of the fill-in-the-blanks is filled in with each of the candidate idioms can be obtained by using the idiom selection fill-in-the-blank model obtained based on deep learning training of artificial intelligence, and then the target answers of the idiom fill-in-the-blank questions are output with high efficiency and high accuracy based on the confidence. In this process, the corresponding target answers can be automatically output without manual search for answers or professional idiom knowledge of a user, which not only improves efficiency and accuracy of finding answers, but also reduces labor costs.

In an embodiment, before step S3 of inputting the fill-in-the-blank text and the explanatory text into a pre-trained idiom selection fill-in-the-blank model, to obtain a confidence that each of the fill-in-the-blanks is filled in with each of the candidate idioms, the method includes the following steps.

Step S01: Obtain training samples, where the training samples include a plurality of corpus texts of idiom fill-in-the-blank questions with selected answers and an explanatory text of all idioms in an idiom library.

Step S02: Input the training samples into a BERT language model-based natural language neural network for training to obtain the idiom selection fill-in-the-blank model, where the natural language neural network includes a network output layer and a convolutional layer, the convolutional layer is formed by stacking a plurality of convolutional networks in sequence, an input layer of a latter convolutional network is connected to output layers of all former convolutional networks, an output layer of each of the convolutional networks is connected to an output layer of the BERT language model, and an output layer of the last convolutional network is connected to the network output layer. It can be understood that a feature matrix output by the output layer of the foregoing BERT language model is output to each of the convolutional networks. At the same time, the output layer of each of the convolutional networks is also connected to the input layers of all latter convolutional networks. In this embodiment, the foregoing improvements are made to the model structure to increase the depth of the neural network and make the neural network have a stronger feature extraction capability.

In this embodiment, step S02 of inputting the training samples into a BERT language model-based natural language neural network for training to obtain the idiom selection fill-in-the-blank model specifically includes the following steps.

a: Input the training samples into the BERT language model, and extract a feature matrix of the training samples based on the BERT language model.

b: Input the feature matrix into the natural language neural network for iterative training to obtain the idiom selection fill-in-the-blank model.

In an embodiment, the foregoing BERT language model is obtained by running a self-supervised learning method on the basis of massive corpora, and is a good feature vector representation for word learning. The foregoing self-supervised learning refers to supervised learning running on data without manual annotation.

In another embodiment, the foregoing BERT language model uses two unsupervised prediction tasks for pre-training. The two unsupervised prediction tasks are Masked LM and Next Sentence Prediction.

A network architecture of the foregoing BERT language model is a multi-layer Transformer structure. Its biggest feature is that a conventional RNN and CNN are removed, and a distance between two words at any positions is converted to 1 through an attention mechanism. Such practice effectively solves the thorny problem of long-term dependency in NLP. The Transformer structure has been widely used in the field of NLP, and is not described in detail herein.

In an NLP (natural language processing) task, a vector representation of the feature matrix output by the BERT language model can be directly used as a word embedding feature of the NLP task. The BERT language model is a model provided for transfer learning of other tasks. The foregoing BERT language model may be used as a feature extractor after being fine-tuned or fixed based on the task.

In embodiment, before step S5 of calculating, based on a KM algorithm and the confidence that each of the fill-inthe-blanks is filled in with each of the candidate idioms, a sum of the confidences that the fill-in-the-blanks are filled in with the candidate idioms in each group of answers, the method includes the following steps.

Step S51: Separately determine whether there is at least one candidate idiom in each group of answers for which the confidence that each of the fill-in-the-blanks is filled in with the at least one candidate idiom is less than a first threshold.

Step S52: If yes, eliminate corresponding answers, and skip calculating a sum of the confidences that each of the fill-in-the-blanks is filled in with the at least one candidate idiom in the eliminated answers.

In this embodiment, since the number of the answers formed above is n*(n−1)*(n−2)* . . . *(n−m+1), when n and m are larger, the number of the answers formed is larger. If the sum of confidences is calculated separately for each group of answers, a calculation amount is large, affecting calculation efficiency. It can be understood that some of the answers formed above are obviously correct. For example, in a certain group of answers, when a certain candidate idiom used to fill in the fill-in-the-blank obviously does not conform, it can be determined that not all of the group of answers are correct. Therefore, it is necessary to only separately determine whether each group of answers has a candidate idiom that obviously does not conform; if such a candidate idiom exists, the group of answers is eliminated, and no sum of confidences is calculated. Such practice can significantly reduce the calculation amount. In this embodiment, when the confidence that each of the fill-in-the-blanks is filled in with each of the candidate idioms has been obtained, whether it is obviously wrong to fill in a certain fill-in-the-blank with a certain candidate idiom can be determined based on whether a value of the confidence is excessively low (the confidence is less than a threshold, i.e., the first threshold).

In an embodiment, after step S6 of obtaining a group of answers with the highest confidence sum as target answers, and outputting the target answers as answers to the idiom fill-in-the-blank questions, the method further includes the following steps.

Step S7: Fill in the fill-in-the-blank text with the target answers to obtain an answer text.

Step S8: Obtain a score for the answer text given by a user, and determine whether the score is greater than a second threshold, where the user scores the answer text based on the standard answers.

Step S9: If the score is greater than the second threshold, form a training set from the answer text and an explanatory text of all candidate idioms of the target answers, and input the training set into the idiom selection fill-in-the-blank model for retraining.

Step S10: Save the retrained idiom selection fill-in-the-blank model to a blockchain.

In this embodiment, since a question type of the foregoing idiom fill-in-the-blank questions is changing, the specific text content of the question text is also different from corpora in original training samples. Therefore, to improve calculation accuracy of the foregoing idiom fill-in-the-blank model in other subsequent scenarios and improve a generalization capability of the model, it is necessary to continue to retrain the foregoing idiom selection fill-in-the-blank model. Before retraining, it is necessary to confirm that the foregoing target answers are the correct ones to the largest extent. Therefore, a user (a teacher, etc.) can score the answer text based on standard answers, so as to obtain the score for the answer text, and then determine whether the score is greater than the second threshold; and if the score is greater than the threshold, it can be determined that the accuracy of the target answers output by the foregoing idiom selection fill-in-the-blank model is high. In this case, the corresponding answer text and the explanatory text of all the candidate idioms in the target answers can be used to form the training set, and the training set can be input into the idiom selection fill-in-the-blank model for retraining. In other embodiments, if the standard answers can be obtained from the teacher user, the standard answers can be used to retrain the idiom selection fill-in-the-blank model.

To enhance security of the foregoing idiom selection fill-in-the-blank model, the foregoing retrained idiom selection fill-in-the-blank model is saved to a blockchain. The blockchain is a new application mode of computer technologies such as distributed data storage, point-to-point transmission, a consensus mechanism and an encryption algorithm. The blockchain is essentially a decentralized database, and is a series of data blocks associated using a cryptographic method. Each data block contains information about a batch of network transactions, and is used to verify the validity of the information (anti-counterfeiting) and generate the next block. The blockchain may include a blockchain underlying platform, a platform product service layer and an application service layer.

In an embodiment, the idiom fill-in-the-blank questions are used to test a student.

After step S6 of obtaining a group of answers with the highest confidence sum as target answers, and outputting the target answers as answers to the idiom fill-in-the-blank questions, the method further includes the following steps.

Step S7a: Obtain a test text uploaded by a terminal of the student, where the test text is a text in which the student fills in the fill-in-the-blank text of the idiom fill-in-the-blank questions with student answers; and when the terminal of the student uploads the test text, sequentially splice the student answers with which the idiom fill-in-the-blank questions are filled in to obtain a first idiom combination, perform hash calculation on the first idiom combination based on the blockchain to obtain a corresponding hash value, and add the hash value as an identification code to the test text.

Step S8a: Extract all student answers in the test text, and sequentially splice all the student answers to obtain a second idiom combination.

Step S9a: Perform hash calculation on the second idiom combination based on the blockchain to obtain a corresponding verification hash value.

Step S10a: Identify the identification code in the test text, and verify whether the verification hash value is consistent with the identification code.

Step S11a: If yes, compare the student answers with the target answers one by one to obtain accuracy of the student answers.

In this embodiment, the foregoing method is applied to a student test scenario. To test a student's true idiom level, it should be ensured that student answers submitted by the student are correct and not tampered with. Therefore, when the student submits a test text with student answers through a terminal after filling in the fill-in-the-blank text of the idiom fill-in-the-blank questions with the student answers, the terminal needs to sequentially splice the student answers with which the student fills in the fill-in-the-blank questions to obtain the first idiom combination, perform hash calculation on the first idiom combination to obtain the corresponding hash value, and add the hash value as an identification code to the test text. The hash calculation can transform the foregoing first idiom combination into a hash value with a fixed length, and the foregoing process is irreversible, so that it is impossible to transform the hash value into the foregoing first idiom combination. Such practice prevents other users from obtaining the foregoing hash value and then obtain the foregoing student answers by reverse deduction. The foregoing identification code added to the test text is used as a basis for verifying whether the foregoing test text has been tampered with.

When the test text uploaded by the foregoing terminal of the student is obtained, the student answers are extracted, and are combined and hashed based on the same process to obtain a verification hash value, so as to determine whether the verification hash value is consistent with the foregoing identification code. If yes, it indicates that the student's test text has not been tampered with, and the student answers are valid. In this case, the student answers are compared with the target answers to obtain accuracy of the student answers.

Figure 2:
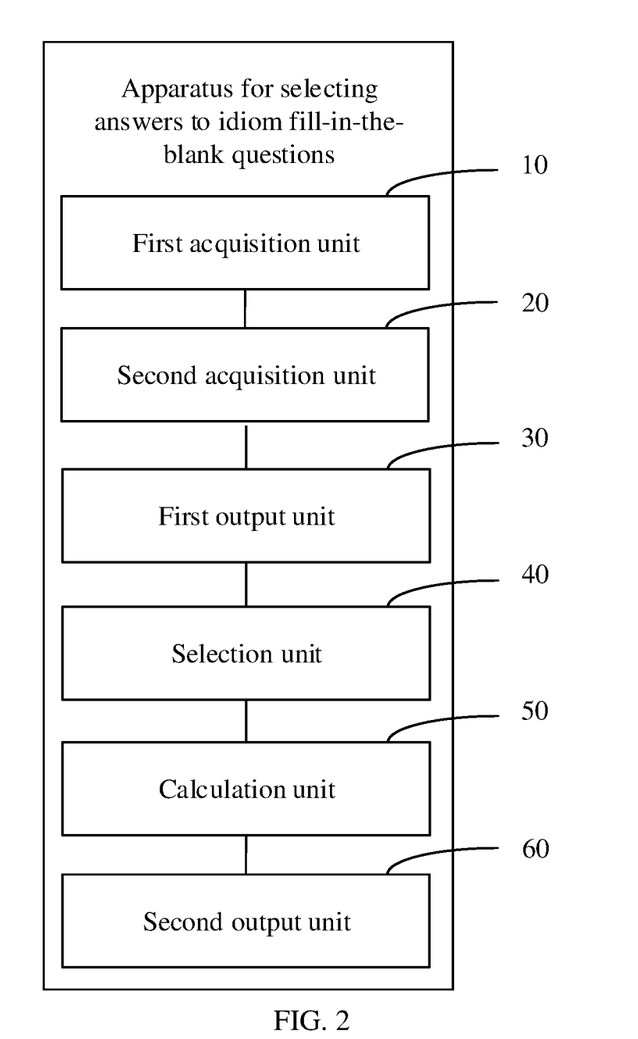
FIG. 2 is a structural block diagram of an apparatus for selecting answers to idiom fill-in-the-blank questions in an embodiment of the present application.

Referring to FIG. 2, an embodiment of the present application further provides an apparatus for selecting answers to idiom fill-in-the-blank questions, including:

a first acquisition unit 10, configured to obtain a question text of idiom fill-in-the-blank questions, where the question text includes a fill-in-the-blank text and n candidate idioms, and the fill-in-the-blank text includes m fill-in-the-blanks to be filled in with the candidate idioms;

a second acquisition unit 20, configured to obtain an explanatory text of all the candidate idioms;

a first output unit 30, configured to input the fill-in-the-blank text and the explanatory text into a pre-trained idiom selection fill-in-the-blank model, to obtain a confidence that each of the fill-in-the-blanks is filled in with each of the candidate idioms;

a selection unit 40, configured to select m idioms from the n candidate idioms, and randomly arrange the m idioms to fill in the m fill-in-the-blanks to form a plurality of groups of answers, where in each group of answers, the candidate idioms can be selected to fill in the fill-in-the-blanks only once at most;

a calculation unit 50, configured to calculate, based on a KM algorithm and the confidence that each of the fill-in-the-blanks is filled in with each of the candidate idioms, a sum of the confidences that the fill-in-the-blanks are filled in with the candidate idioms in each group of answers; and a second output unit 60, configured to obtain a group of answers with the highest confidence sum as target answers, and output the target answers as answers to the idiom fill-in-the-blank questions.

In an embodiment, the apparatus further includes:

a third acquisition unit, configured to obtain training samples, where the training samples include a plurality of corpus texts of idiom fill-in-the-blank questions with selected answers and an explanatory text of all idioms in an idiom library; and a training unit, configured to input the training samples into a BERT language model-based natural language neural network for training to obtain the idiom selection fill-in-the-blank model, where the natural language neural network includes a network output layer and a convolutional layer, the convolutional layer is formed by stacking a plurality of convolutional networks in sequence, an input layer of a latter convolutional network is connected to output layers of all former convolutional networks, an output layer of each of the convolutional networks is connected to an output layer of the BERT language model, and an output layer of the last convolutional network is connected to the network output layer.

In an embodiment, the training unit is specifically configured to:

input the training samples into the BERT language model, and extracting a feature matrix of the training samples based on the BERT language model; and input the feature matrix into the natural language neural network for iterative training to obtain the idiom selection fill-in-the-blank model.

In an embodiment, the apparatus further includes:

a first determining unit, configured to separately determine whether there is at least one candidate idiom in each group of answers for which the confidence that each of the fill-in-the-blanks is filled in with the at least one candidate idiom is less than a first threshold; and an elimination unit, configured to, if there is at least one such candidate idiom, eliminate corresponding answers, and skip calculating a sum of the confidences that each of the fill-in-the-blanks is filled in with the at least one candidate idiom in the eliminated answers.

In an embodiment, the apparatus further includes:

a filling-in unit, configured to fill in the fill-in-the-blank text with the target answers to obtain an answer text;

a second determining unit, configured to obtain a score for the answer text given by a user, and determine whether the score is greater than a second threshold, where the user scores the answer text based on the standard answers;

a retraining unit, configured to, if the score is greater than the second threshold, form a training set from the answer text and an explanatory text of all candidate idioms of the target answers, and input the training set into the idiom selection fill-in-the-blank model for retraining; and a saving unit, configured to, save the retrained idiom selection fill-in-the-blank model to a blockchain.

In an embodiment, the idiom fill-in-the-blank questions are used to test a student; and the apparatus further includes:

a fourth acquisition unit, configured to obtain a test text uploaded by a terminal of the student, where the test text is a text in which the student fills in the fill-in-the-blank text of the idiom fill-in-the-blank questions with student answers; and when the terminal of the student uploads the test text, sequentially splice the student answers with which the idiom fill-in-the-blank questions are filled in to obtain a first idiom combination, perform hash calculation on the first idiom combination to obtain a corresponding hash value, and add the hash value as an identification code to the test text;

an extraction unit, configured to extract all student answers in the test text, and sequentially splice all the student answers to obtain a second idiom combination;

a hash calculation unit, configured to perform hash calculation on the second idiom combination based on the blockchain to obtain a corresponding verification hash value;

a verification unit, configured to identify the identification code in the test text, and verify whether the verification hash value is consistent with the identification code; and a comparison unit, configured to, if the verification hash value is consistent with the identification code, compare the student answers with the target answers one by one to obtain accuracy of the student answers.

In this embodiment, for specific implementation of each unit in the foregoing apparatus embodiment, reference is made to the description in the foregoing method embodiment, and details are not described herein again.

Figure 3:
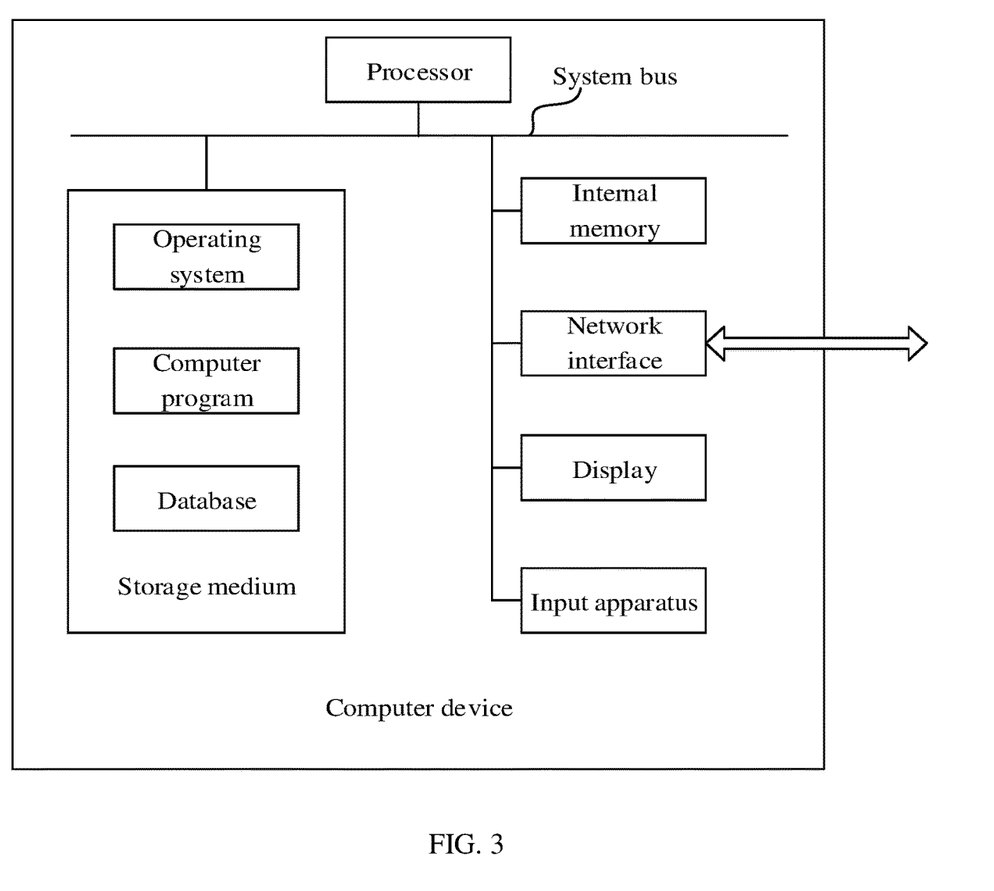
FIG. 3 is a schematic structural block diagram of a computer device according to an embodiment of the present application.

Referring to FIG. 3, an embodiment of the present application further provides a computer device. The computer device may be a server, and an internal structure thereof may be shown in FIG. 3. The computer device includes a processor, a memory, a network interface, and a database that are connected to one another through a system bus. The processor of the computer device is used to provide calculation and control capabilities. The memory of the computer device includes a non-volatile storage medium and an internal memory. The non-volatile storage medium stores an operating system, a computer program and a database. The internal memory provides an environment for the operation of the operating system and the computer program in the non-volatile storage medium. The database of the computer device is configured to store idiom fill-in-the-blank questions and the like. The network interface of the computer device is configured to communicate with an external terminal through a network connection. The computer program is executed by the processor to implement a method for selecting answers to idiom fill-in-the-blank questions, and the method includes the following steps:

obtaining a question text of idiom fill-in-the-blank questions, where the question text includes a fill-in-the-blank text and n candidate idioms, and the fill-in-the-blank text includes m fill-in-the-blanks to be filled in with the candidate idioms;

obtaining an explanatory text of all the candidate idioms;

inputting the fill-in-the-blank text and the explanatory text into a pre-trained idiom selection fill-in-the-blank model, to obtain a confidence that each of the fill-in-the-blanks is filled in with each of the candidate idioms;

selecting m idioms from the n candidate idioms, and randomly arranging the m idioms to fill in the m fill-in-the-blanks to form a plurality of groups of answers, where in each group of answers, the candidate idioms can be selected to fill in the fill-in-the-blanks only once at most;

calculating, based on a KM algorithm and the confidence that each of the fill-in-the-blanks is filled in with each of the candidate idioms, a sum of the confidences that the fill-in-the-blanks are filled in with the candidate idioms in each group of answers; and obtaining a group of answers with the highest confidence sum as target answers, and outputting the target answers as answers to the idiom fill-in-the-blank questions.

A person skilled in the art can understand that the structure shown in FIG. 3 is only a block diagram of a part of the structure related to the solution of the present application, and does not constitute a limitation on the computer device to which the solution of the present application is applied.

An embodiment of the present application further provides a computer-readable storage medium, on which a computer program is stored, where when the computer program is executed by a processor, a method for selecting answers to idiom fill-in-the-blank questions is implemented, and the method includes the following steps:

obtaining a question text of idiom fill-in-the-blank questions, where the question text includes a fill-in-the-blank text and n candidate idioms, and the fill-in-the-blank text includes m fill-in-the-blanks to be filled in with the candidate idioms;

obtaining an explanatory text of all the candidate idioms;

inputting the fill-in-the-blank text and the explanatory text into a pre-trained idiom selection fill-in-the-blank model, to obtain a confidence that each of the fill-in-the-blanks is filled in with each of the candidate idioms;

selecting m idioms from the n candidate idioms, and randomly arranging the m idioms to fill in the m fill-in-the-blanks to form a plurality of groups of answers, where in each group of answers, the candidate idioms can be selected to fill in the fill-in-the-blanks only once at most;

calculating, based on a KM algorithm and the confidence that each of the fill-in-the-blanks is filled in with each of the candidate idioms, a sum of the confidences that the fill-in-the-blanks are filled in with the candidate idioms in each group of answers; and obtaining a group of answers with the highest confidence sum as target answers, and outputting the target answers as answers to the idiom fill-in-the-blank questions.

It can be understood that the computer-readable storage medium in this embodiment may be a volatile readable storage medium or a non-volatile readable storage medium.

In conclusion, the embodiments of the present application provide the method and apparatus for selecting answers to idiom fill-in-the-blank questions, the computer device, and the storage medium. The method includes: obtaining a question text of idiom fill-in-the-blank questions, where the question text includes a fill-in-the-blank text and n candidate idioms, and the fill-in-the-blank text includes m fill-in-the-blanks to be filled in with the candidate idioms; obtaining an explanatory text of all the candidate idioms; inputting the fill-in-the-blank text and the explanatory text into a pre-trained idiom selection fill-in-the-blank model, to obtain a confidence that each of the fill-in-the-blanks is filled in with each of the candidate idioms; selecting m idioms from the n candidate idioms, and randomly arranging the m idioms to fill in the m fill-in-the-blanks to form a plurality of groups of answers; calculating, based on a KM algorithm and the confidence that each of the fill-in-the-blanks is filled in with each of the candidate idioms, a sum of the confidences that the fill-in-the-blanks are filled in with the candidate idioms in each group of answers; and obtaining a group of answers with the highest confidence sum as target answers, and outputting the target answers as answers to the idiom fill-in-the-blank questions. In the present application, artificial intelligence is used to obtain the sum of the confidences that the fill-in-the-blanks are filled in with the candidate idioms in each group of answers, so as to use the group of answers with the highest confidence sum as the target answers, and obtain the answers to the idiom fill-in-the-blanks with high efficiency and high accuracy.

What is claimed is:

1. A method for selecting answers to idiom fill-in-the-blank questions, comprising the following steps:

obtaining a question text of idiom fill-in-the-blank questions, wherein the question text comprises a fill-in-the-blank text and n candidate idioms, and the fill-in-the-blank text comprises m fill-in-the-blanks to be filled in with the candidate idioms;

obtaining an explanatory text of all the candidate idioms;

inputting the fill-in-the-blank text and the explanatory text into a pre-trained idiom selection fill-in-the-blank model, to obtain a confidence that each of the fill-in-the-blanks is filled in with each of the candidate idioms;

selecting m idioms from the n candidate idioms, and randomly arranging the m idioms to fill in the m fill-in-the-blanks to form a plurality of groups of answers, wherein in each group of answers, the candidate idioms can be selected to fill in the fill-in-the-blanks only once at most;

calculating, based on a KM algorithm and the confidence that each of the fill-in-the-blanks is filled in with each of the candidate idioms, a sum of the confidences that the fill-in-the-blanks are filled in with the candidate idioms in each group of answers; and obtaining a group of answers with the highest confidence sum as target answers, and outputting the target answers as answers to the idiom fill-in-the-blank questions.

2. The method for selecting answers to idiom fill-in-the-blank questions according to claim 1, before the step of inputting the fill-in-the-blank text and the explanatory text into a pre-trained idiom selection fill-in-the-blank model, to obtain a confidence that each of the fill-in-the-blanks is filled in with each of the candidate idioms, comprising:

obtaining training samples, wherein the training samples comprise a plurality of corpus texts of idiom fill-in-the-blank questions with selected answers and an explanatory text of all idioms in an idiom library; and inputting the training samples into a BERT language model-based natural language neural network for training to obtain the idiom selection fill-in-the-blank model, wherein the natural language neural network comprises a network output layer and a convolutional layer, the convolutional layer is formed by stacking a plurality of convolutional networks in sequence, an input layer of a latter convolutional network is connected to output layers of all former convolutional networks, an output layer of each of the convolutional networks is connected to an output layer of the BERT language model, and an output layer of the last convolutional network is connected to the network output layer.

3. The method for selecting answers to idiom fill-in-the-blank questions according to claim 2, wherein the step of inputting the training samples into a BERT language model-based natural language neural network for training to obtain the idiom selection fill-in-the-blank model comprises:

inputting the training samples into the BERT language model, and extracting a feature matrix of the training samples based on the BERT language model; and inputting the feature matrix into the natural language neural network for iterative training to obtain the idiom selection fill-in-the-blank model.

4. The method for selecting answers to idiom fill-in-the-blank questions according to claim 1, before the step of calculating, based on a KM algorithm and the confidence that each of the fill-in-the-blanks is filled in with each of the candidate idioms, a sum of the confidences that the fill-in-the-blanks are filled in with the candidate idioms in each group of answers, comprising:

separately determining whether there is at least one candidate idiom in each group of answers for which the confidence that each of the fill-in-the-blanks is filled in with the at least one candidate idiom is less than a first threshold; and if yes, eliminating corresponding answers, and skipping calculating a sum of the confidences that each of the fill-in-the-blanks is filled in with the at least one candidate idiom in the eliminated answers.

5. The method for selecting answers to idiom fill-in-the-blank questions according to claim 1, after the step of obtaining a group of answers with the highest confidence sum as target answers, and outputting the target answers as answers to the idiom fill-in-the-blank questions, further comprising:

filling in the fill-in-the-blank text with the target answers to obtain an answer text;

obtaining a score for the answer text given by a user, and determining whether the score is greater than a second threshold, wherein the user scores the answer text based on the standard answers;

if the score is greater than the second threshold, forming a training set from the answer text and an explanatory text of all candidate idioms of the target answers, and inputting the training set into the idiom selection fill-in-the-blank model for retraining; and saving the retrained idiom selection fill-in-the-blank model to a blockchain.

6. The method for selecting answers to idiom fill-in-the-blank questions according to claim 1, wherein the idiom fill-in-the-blank questions are used to test a student; and after the step of obtaining a group of answers with the highest confidence sum as target answers, and outputting the target answers as answers to the idiom fill-in-the-blank questions, the method further comprises:

obtaining a test text uploaded by a terminal of the student, wherein the test text is a text in which the student fills in the fill-in-the-blank text of the idiom fill-in-the-blank questions with student answers; and when the terminal of the student uploads the test text, sequentially splicing the student answers with which the idiom fill-in-the-blank questions are filled in to obtain a first idiom combination, performing hash calculation on the first idiom combination based on the blockchain to obtain a corresponding hash value, and adding the hash value as an identification code to the test text;

extracting all student answers in the test text, and sequentially splicing all the student answers to obtain a second idiom combination;

performing hash calculation on the second idiom combination based on the blockchain to obtain a corresponding verification hash value;

identifying the identification code in the test text, and verifying whether the verification hash value is consistent with the identification code; and if yes, comparing the student answers with the target answers one by one to obtain accuracy of the student answers.

7. A computer device, comprising a memory and a processor, wherein a computer program is stored in the memory; and when the processor executes the computer program, the computer device implements a method for selecting answers to idiom fill-in-the-blank questions by:

obtaining a question text of idiom fill-in-the-blank questions, wherein the question text comprises a fill-in-the-blank text and n candidate idioms, and the fill-in-the-blank text comprises m fill-in-the-blanks to be filled in with the candidate idioms;

obtaining an explanatory text of all the candidate idioms;

inputting the fill-in-the-blank text and the explanatory text into a pre-trained idiom selection fill-in-the-blank model, to obtain a confidence that each of the fill-in-the-blanks is filled in with each of the candidate idioms;

selecting m idioms from the n candidate idioms, and randomly arranging the m idioms to fill in the m fill-in-the-blanks to form a plurality of groups of answers, wherein in each group of answers, the candidate idioms can be selected to fill in the fill-in-the-blanks only once at most;

calculating, based on a KM algorithm and the confidence that each of the fill-in-the-blanks is filled in with each of the candidate idioms, a sum of the confidences that the fill-in-the-blanks are filled in with the candidate idioms in each group of answers; and obtaining a group of answers with the highest confidence sum as target answers, and outputting the target answers as answers to the idiom fill-in-the-blank questions.

8. The computer device according to claim 7, wherein before the step of inputting the fill-in-the-blank text and the explanatory text into a pre-trained idiom selection fill-in-the-blank model, to obtain a confidence that each of the fill-in-the-blanks is filled in with each of the candidate idioms, the computer device is configured to:

obtain training samples, wherein the training samples comprise a plurality of corpus texts of idiom fill-in-the-blank questions with selected answers and an explanatory text of all idioms in an idiom library; and input the training samples into a BERT language model-based natural language neural network for training to obtain the idiom selection fill-in-the-blank model, wherein the natural language neural network comprises a network output layer and a convolutional layer, the convolutional layer is formed by stacking a plurality of convolutional networks in sequence, an input layer of a latter convolutional network is connected to output layers of all former convolutional networks, an output layer of each of the convolutional networks is connected to an output layer of the BERT language model, and an output layer of the last convolutional network is connected to the network output layer.

9. The computer device according to claim 8, wherein the computer device is specifically configured to:

input the training samples into the BERT language model, and extract a feature matrix of the training samples based on the BERT language model; and input the feature matrix into the natural language neural network for iterative training to obtain the idiom selection fill-in-the-blank model.

10. The computer device according to claim 7, wherein before the step of calculating, based on a KM algorithm and the confidence that each of the fill-in-the-blanks is filled in with each of the candidate idioms, a sum of the confidences that the fill-in-the-blanks are filled in with the candidate idioms in each group of answers, the computer device is configured to:

separately determine whether there is at least one candidate idiom in each group of answers for which the confidence that each of the fill-in-the-blanks is filled in with the at least one candidate idiom is less than a first threshold; and if yes, eliminate corresponding answers, and skip calculating a sum of the confidences that each of the fill-in-the-blanks is filled in with the at least one candidate idiom in the eliminated answers.

11. The computer device according to claim 7, wherein after the step of obtaining a group of answers with the highest confidence sum as target answers, and outputting the target answers as answers to the idiom fill-in-the-blank questions, the computer device is further configured to:

fill in the fill-in-the-blank text with the target answers to obtain an answer text;

obtain a score for the answer text given by a user, and determine whether the score is greater than a second threshold, wherein the user scores the answer text based on the standard answers;

if the score is greater than the second threshold, form a training set from the answer text and an explanatory text of all candidate idioms of the target answers, and input the training set into the idiom selection fill-in-the-blank model for retraining; and save the retrained idiom selection fill-in-the-blank model to a blockchain.

12. The computer device according to claim 7, wherein the idiom fill-in-the-blank questions are used to test a student; and after the step of obtaining a group of answers with the highest confidence sum as target answers, and outputting the target answers as answers to the idiom fill-in-the-blank questions, the computer device is further configured to:

obtain a test text uploaded by a terminal of the student, wherein the test text is a text in which the student fills in the fill-in-the-blank text of the idiom fill-in-the-blank questions with student answers; and when the terminal of the student uploads the test text, sequentially splice the student answers with which the idiom fill-in-the-blank questions are filled in to obtain a first idiom combination, perform hash calculation on the first idiom combination based on the blockchain to obtain a corresponding hash value, and add the hash value as an identification code to the test text;

extract all student answers in the test text, and sequentially splice all the student answers to obtain a second idiom combination;

perform hash calculation on the second idiom combination based on the blockchain to obtain a corresponding verification hash value;

identify the identification code in the test text, and verify whether the verification hash value is consistent with the identification code; and if yes, compare the student answers with the target answers one by one to obtain accuracy of the student answers.

13. A non-transitory computer-readable storage medium, on which a computer program is stored, wherein when the computer program is executed by a processor, a method for selecting answers to idiom fill-in-the-blank questions is implemented, and the method comprises the following steps:

obtaining a question text of idiom fill-in-the-blank questions, wherein the question text comprises a fill-in-the-blank text and n candidate idioms, and the fill-in-the-blank text comprises m fill-in-the-blanks to be filled in with the candidate idioms;

obtaining an explanatory text of all the candidate idioms;

inputting the fill-in-the-blank text and the explanatory text into a pre-trained idiom selection fill-in-the-blank model, to obtain a confidence that each of the fill-in-the-blanks is filled in with each of the candidate idioms;

selecting m idioms from the n candidate idioms, and randomly arranging the m idioms to fill in the m fill-in-the-blanks to form a plurality of groups of answers, wherein in each group of answers, the candidate idioms can be selected to fill in the fill-in-the-blanks only once at most;

calculating, based on a KM algorithm and the confidence that each of the fill-in-the-blanks is filled in with each of the candidate idioms, a sum of the confidences that the fill-in-the-blanks are filled in with the candidate idioms in each group of answers; and obtaining a group of answers with the highest confidence sum as target answers, and outputting the target answers as answers to the idiom fill-in-the-blank questions.

14. The non-transitory computer-readable storage medium according to claim 13, wherein before the step of inputting the fill-in-the-blank text and the explanatory text into a pre-trained idiom selection fill-in-the-blank model, to obtain a confidence that each of the fill-in-the-blanks is filled in with each of the candidate idioms, the method comprises:
  obtaining training samples, wherein the training samples comprise a plurality of corpus texts of idiom fill-in-the-blank questions with selected answers and an explanatory text of all idioms in an idiom library; and
  inputting the training samples into a BERT language model-based natural language neural network for training to obtain the idiom selection fill-in-the-blank model, wherein the natural language neural network comprises a network output layer and a convolutional layer, the convolutional layer is formed by stacking a plurality of convolutional networks in sequence, an input layer of a latter convolutional network is connected to output layers of all former convolutional networks, an output layer of each of the convolutional networks is connected to an output layer of the BERT language model, and an output layer of the last convolutional network is connected to the network output layer.

15. The non-transitory computer-readable storage medium according to claim 14, wherein the step of inputting the training samples into a BERT language model-based natural language neural network for training to obtain the idiom selection fill-in-the-blank model comprises:
  inputting the training samples into the BERT language model, and extracting a feature matrix of the training samples based on the BERT language model; and
  inputting the feature matrix into the natural language neural network for iterative training to obtain the idiom selection fill-in-the-blank model.

16. The non-transitory computer-readable storage medium according to claim 13, wherein before the step of calculating, based on a KM algorithm and the confidence that each of the fill-in-the-blanks is filled in with each of the candidate idioms, a sum of the confidences that the fill-in-the-blanks are filled in with the candidate idioms in each group of answers, the method comprises:
  separately determining whether there is at least one candidate idiom in each group of answers for which the confidence that each of the fill-in-the-blanks is filled in with the at least one candidate idiom is less than a first threshold; and
  if yes, eliminating corresponding answers, and skipping calculating a sum of the confidences that each of the fill-in-the-blanks is filled in with the at least one candidate idiom in the eliminated answers.

17. The non-transitory computer-readable storage medium according to claim 13, wherein after the step of obtaining a group of answers with the highest confidence sum as target answers, and outputting the target answers as answers to the idiom fill-in-the-blank questions, the method further comprises:
  filling in the fill-in-the-blank text with the target answers to obtain an answer text;
  obtaining a score for the answer text given by a user, and determining whether the score is greater than a second threshold, wherein the user scores the answer text based on the standard answers;
  if the score is greater than the second threshold, forming a training set from the answer text and an explanatory text of all candidate idioms of the target answers, and inputting the training set into the idiom selection fill-in-the-blank model for retraining; and
  saving the retrained idiom selection fill-in-the-blank model to a blockchain.

18. The non-transitory computer-readable storage medium according to claim 13, wherein the idiom fill-in-the-blank questions are used to test a student; and
  after the step of obtaining a group of answers with the highest confidence sum as target answers, and outputting the target answers as answers to the idiom fill-in-the-blank questions, the method further comprises:
  obtaining a test text uploaded by a terminal of the student, wherein the test text is a text in which the student fills in the fill-in-the-blank text of the idiom fill-in-the-blank questions with student answers; and when the terminal of the student uploads the test text, sequentially splicing the student answers with which the idiom fill-in-the-blank questions are filled in to obtain a first idiom combination, performing hash calculation on the first idiom combination based on the blockchain to obtain a corresponding hash value, and adding the hash value as an identification code to the test text;
  extracting all student answers in the test text, and sequentially splicing all the student answers to obtain a second idiom combination;
  performing hash calculation on the second idiom combination based on the blockchain to obtain a corresponding verification hash value;
  identifying the identification code in the test text, and verifying whether the verification hash value is consistent with the identification code; and
  if yes, comparing the student answers with the target answers one by one to obtain accuracy of the student answers.

* * * * *